(12) United States Patent
Wu

(10) Patent No.: US 11,210,243 B2
(45) Date of Patent: Dec. 28, 2021

(54) DATA STORAGE DEVICE, ELECTRONIC APPARATUS, AND SYSTEM CAPABLE OF REMOTELY CONTROLLING ELECTRONIC APPARATUS

(71) Applicant: INNODISK CORPORATION, New Taipei (TW)

(72) Inventor: Chih-Ching Wu, New Taipei (TW)

(73) Assignee: Innodisk Corporation, New Taipei (TW)

( * ) Notice: Subject to any disclaimer, the term of this patent is extended or adjusted under 35 U.S.C. 154(b) by 0 days.

(21) Appl. No.: 16/832,414

(22) Filed: Mar. 27, 2020

(65) Prior Publication Data

US 2021/0109875 A1 Apr. 15, 2021

(30) Foreign Application Priority Data

Oct. 9, 2019 (TW) ................. 108136623

(51) Int. Cl.
*G06F 13/16* (2006.01)
*H04L 29/08* (2006.01)
*G06F 13/42* (2006.01)

(52) U.S. Cl.
CPC ...... *G06F 13/1684* (2013.01); *G06F 13/4282* (2013.01); *H04L 67/10* (2013.01); *G06F 2213/0026* (2013.01); *G06F 2213/0032* (2013.01)

(58) Field of Classification Search
CPC ............. G06F 13/1684; G06F 13/4282; G06F 2213/0032; G06F 2213/0026; H04L 67/10

USPC ........................ 710/2, 5, 8, 13, 15, 300, 305
See application file for complete search history.

(56) References Cited

U.S. PATENT DOCUMENTS

| | | | | |
|---|---|---|---|---|
| 6,981,070 B1 * | 12/2005 | Luk | ........................ | G06F 3/0617 710/5 |
| 7,310,720 B2 * | 12/2007 | Cornett | ................ | G05B 19/056 711/115 |
| 9,606,809 B2 * | 3/2017 | Zhang | .................... | G06F 9/4401 |
| 11,023,566 B2 * | 6/2021 | Lunghi | ................. | G06F 21/602 |
| 2010/0058194 A1 * | 3/2010 | Owen | .................. | G06F 3/1236 715/740 |
| 2010/0275037 A1 * | 10/2010 | Lee | ........................ | G06F 13/385 713/189 |

(Continued)

*Primary Examiner* — Idriss N Alrobaye
*Assistant Examiner* — Henry W Yu
(74) *Attorney, Agent, or Firm* — Rosenberg, Klein & Lee

(57) ABSTRACT

The invention provides a system capable of remotely controlling electronic apparatus, which includes a cloud management platform and at least one electronic apparatus. The electronic apparatus includes at least one operation element, and a data storage device having a network communication function. The data storage device includes a first transmission interface, a second transmission interface, a data storage unit, and an operation management unit. Via the first transmission interface, data stored in the data storage unit can be read or data can be written into the data storage unit. The operation management unit of the data storage device transmits a specific operation instruction to the operation element via the second transmission interface after receiving the specific operation instruction sent from the cloud management platform, such that the operation element can execute a corresponding operation according to the specific operation instruction.

18 Claims, 8 Drawing Sheets

(56) References Cited

U.S. PATENT DOCUMENTS

| | | | |
|---|---|---|---|
| 2011/0055747 A1* | 3/2011 | Hua | G06F 1/1632 |
| | | | 715/771 |
| 2011/0225330 A1* | 9/2011 | Lavian | G06F 3/038 |
| | | | 710/63 |
| 2016/0154760 A9* | 6/2016 | Davis | G06F 13/102 |
| | | | 710/104 |
| 2018/0039411 A1* | 2/2018 | Stenfort | G06F 3/061 |
| 2019/0272249 A1* | 9/2019 | Olarig | G06F 3/0679 |

* cited by examiner

DATA STORAGE DEVICE, ELECTRONIC APPARATUS, AND SYSTEM CAPABLE OF REMOTELY CONTROLLING ELECTRONIC APPARATUS

This non-provisional application claims priority claim under 35 U.S.C. § 119(a) on Taiwan Patent Application No. 108136623 filed Oct. 9, 2019, the entire contents of which are incorporated herein by reference.

FIELD OF THE INVENTION

The present invention relates to a system capable of remotely controlling an electronic apparatus, more particularly, a system capable of remotely controlling an electronic apparatus by a data storage device in the electronic apparatus.

BACKGROUND

Nowadays, an advanced electronic apparatus usually has a network communication function and a cloud management platform can therefore remotely control the electronic apparatus to execute a specific operation via a network. First, the cloud management platform transmits at least one control instruction to the electronic apparatus in controlling the electronic apparatus. Then, an operating system of the electronic apparatus commands an operation element inside the electronic apparatus to execute a corresponding operation after receiving the control instruction sent from the cloud management platform.

In the past, the operating system of the electronic apparatus was required to process the control instructions sent by the cloud management platform during the controlling of the electronic apparatus by the cloud management platform. However, once the operating system of the electronic apparatus crashes or fails, the manager of the cloud management platform cannot perform any operations on the electronic apparatus, but can only wait for the engineer to go to the installation location of the electronic apparatus and repair the operating system of the electronic apparatus. Besides, in order to be remotely controllable, the electronic apparatus must be additionally configured with a network communication component therein, which will increase the hardware costs of the electronic apparatus.

SUMMARY

It is one objective of the present invention to provide a data storage device having a first transmission interface and a second transmission interface. The first transmission interface is a transmission interface conforming to a specific data transmission specification. Data can be read from or written into the data storage device via the first transmission interface. The second transmission interface is a transmission interface capable of controlling an operation of an electronic apparatus by transmitting an operation instruction to the electronic apparatus so as to control the electronic apparatus to execute a corresponding operation according to the operation instruction. Thus, the data storage device, via the configuration of two transmission interfaces, is not only used for data access, but also used for controlling the operation of the electronic apparatus.

It is another objective of the present invention to provide an electronic apparatus disposed with a data storage device therein. The data storage device has a network communication function, and includes a first transmission interface and a second transmission interface. During operation, the electronic apparatus reads required data stored in the data storage device via the first transmission interface of the data storage device, or writes data generated from the operation into the data storage device via the first transmission interface of the data storage device. The remote manager sends a specific operation instruction to the data storage device of the electronic apparatus via a network. The data storage device transmits the specific operation instruction to an operation element of the electronic apparatus via the second transmission interface after receiving the specific operation instruction, such that the operation element of the electronic apparatus can execute a corresponding operation according to the specific operation instruction. Thus, the manager can remotely control the electronic apparatus to perform the specific operation via the existing data storage device in the electronic apparatus.

It is another objective of the present invention to provide a system capable of remotely controlling electronic apparatus. The system includes a cloud management platform and at least one electronic apparatus. The electronic apparatus includes a data storage device and at least one operation element. The data storage device has a network communication function, and includes a first transmission interface and a second transmission interface. The manager of the cloud management platform sends a specific operation instruction to the data storage device of the electronic apparatus. The data storage device transmits the specific operation instruction to the operation element of the electronic apparatus via the second transmission interface after receiving the specific operation instruction, such that the operation element of the electronic apparatus can execute a reboot for the electronic apparatus, a data collection during a production, an update of production program, or other operation of specific purpose according to the specific operation instruction.

To achieve the above objective, the present invention provides a data storage device that includes a first transmission interface, a second transmission interface, a data storage unit, and an operation management unit. The data storage unit includes a plurality of flash memories and a controller connected to the flash memories and the first transmission interface, wherein data stored in the flash memories can be read or data can be written to the flash memories via the first transmission interface. The operation management unit includes a network communication component and a microprocessor connected to the second transmission interface and the network communication component, wherein the microprocessor is connected to an electronic apparatus via the second transmission interface. When the operation management unit receives a specific operation instruction, the microprocessor of the operation management unit transmits the specific operation instruction to the electronic apparatus via the second transmission interface, and the electronic apparatus executes a corresponding operation according to the specific operation instruction.

In one embodiment of the present invention, the first transmission interface is a transmission interface conforming to a SATA transmission specification, a PCIe transmission specification, or a M.2 transmission specification.

In one embodiment of the present invention, the second transmission interface is a transmission interface conforming to an industrial communication transmission specification, an Ethernet communication specification, or an input and output transmission specification.

In one embodiment of the present invention, the second transmission interface is a transmission interface of serial bus, CAN bus, Ethernet, SPI, PoE, or GPIO.

In one embodiment of the present invention, the second transmission interface includes a plurality of pins and the microprocessor of the operation management unit defines at least one control pin from the plurality of pins of the second transmission interface. The at least one control pin is a pin conforming to a specific type of transmission specification, and the microprocessor of the operation management unit transmits the specific operation instruction to the electronic apparatus based on the specific type of transmission specification via the at least one control pin.

In one embodiment of the present invention, the data storage device is a device configured in the electronic apparatus or a device independent of the electronic apparatus.

In one embodiment of the present invention, the network communication component is a WiFi communication component, an Ethernet communication component, or a 3G, 4G or 5G communication component.

The present invention further provides an electronic apparatus that includes at least one operation element and a data storage device. The data storage device includes a first transmission interface, a second transmission interface, a data storage unit, and an operation management unit. The data storage unit includes a plurality of flash memories and a controller connected to the flash memories and the first transmission interface, wherein the electronic apparatus reads data stored in the flash memories or writes data to the flash memories via the first transmission interface. The operation management unit includes a network communication component and a microprocessor connected to the second transmission interface and the network communication component, wherein the data storage device is connected to the at least one operation element via the second transmission interface. When the operation management unit receives a specific operation instruction, the microprocessor of the operation management unit transmits the specific operation instruction to the electronic apparatus via the second transmission interface, and the electronic apparatus executes a corresponding operation according to the specific operation instruction.

The present invention further provides a system capable of remotely controlling electronic apparatus that includes a cloud management platform and an electronic apparatus. The cloud management platform includes a management interface, and the electronic apparatus includes at least one operation element and a data storage device. The data storage device includes a first transmission interface, a second transmission interface, a data storage unit, and an operation management unit. The data storage unit includes a plurality of flash memories and a controller connected to the flash memories and the first transmission interface, wherein the electronic apparatus reads data stored in the flash memories or writes data to the flash memories via the first transmission interface. The operation management unit includes a network communication component and a microprocessor connected to the network communication component and the second transmission interface, wherein the data storage device is connected to the at least one operation element via the second transmission interface. The cloud management platform sends a specific operation instruction to the data storage device of the electronic apparatus by the management interface, and the operation management unit of the data storage device receives the specific operation instruction via the network communication component and transmits the specific operation instruction to the at least one operation element, such that the at least one operation element executes a corresponding operation according to the specific operation instruction.

In one embodiment of the present invention, the microprocessor is configured with an embedded system, and the operation management unit can monitor an operation of the electronic apparatus by the embedded system.

In one embodiment of the present invention, the specific operation instruction sent from the cloud management platform is an operation instruction for resetting, the operation element is a reset switch, and the operation management unit of the data storage device transmits the operation instruction for resetting to the operation element via the second transmission interface after receiving the operation instruction for resetting, such that the operation element executes a reboot operation for the electronic apparatus.

DETAILED DESCRIPTION OF THE PREFERRED EMBODIMENTS

Figure 1B:
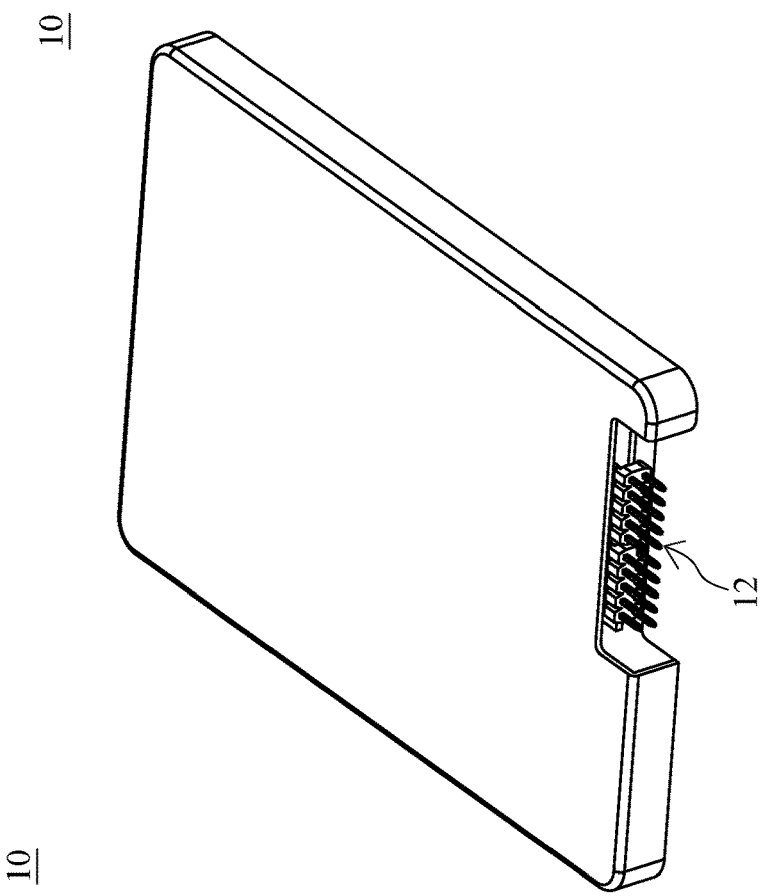
FIG. 1B is a stereogram in a second viewing angle of the data storage device of the present invention.
Figure 1A:
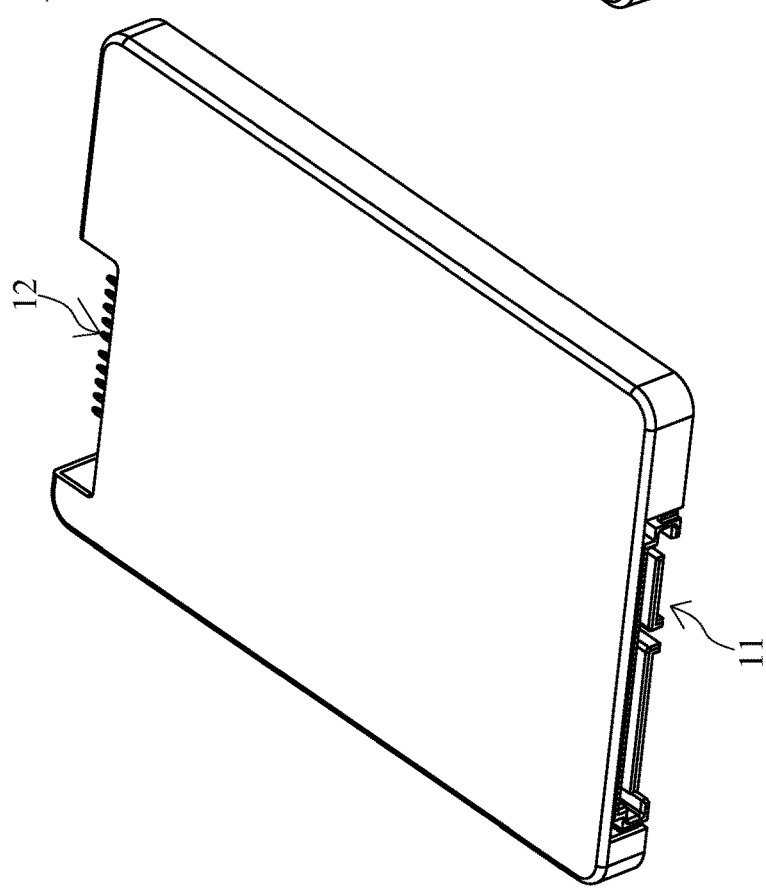
FIG. 1A is a stereogram in a first viewing angle of a data storage device of the present invention.

Referring to FIG. 1A and FIG. 1B, there are shown a stereogram in a first viewing angle and a stereogram in a second viewing angle of a data storage device of the present invention. As shown in FIG. 1A and FIG. 1B, the data storage device 10 of the present invention is a solid state disk (SSD) having two transmission interfaces. The data storage device 10 is provided at a front edge thereof with a first transmission interface 11, and is provided at a rear edge thereof with a second transmission interface 12. The first transmission interface 11 is a transmission interface conforming to a SATA transmission specification, a PCIe transmission specification, or a M.2 transmission specification.

Data stored in the data storage device 10 can be read or data can be written to the data storage device 10 via the first transmission interface 11.

In one embodiment of the present invention, the second transmission interface 12 is a transmission interface conforming to an industrial communication transmission specification, for example, RS232, RS482, or RS485 serial bus, or CAN (Controller Area Network) bus. In other embodiment of the present invention, the second transmission interface 12 is a transmission interface conforming to an Ethernet communication transmission specification, for example, RJ45 or PoE (Power over Ethernet). In another embodiment of the present invention, the second transmission interface 12 is a transmission interface conforming to an input and output transmission specification, for example, GPIO (General Purpose Input/Output). In the present invention, the second transmission interface 12 is an interface used to transmit an instruction for controlling an electronic apparatus.

Figure 2:
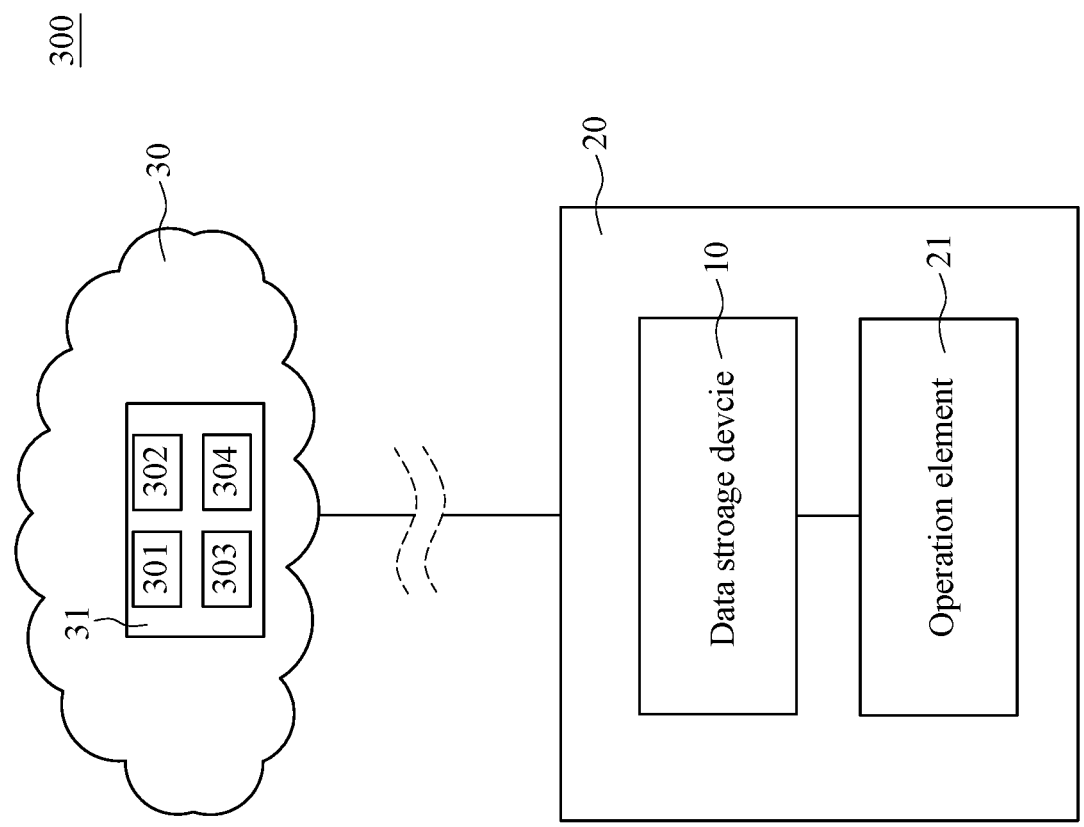
FIG. 2 is an architecture diagram of a system according to one embodiment of the present invention, wherein the system is capable of remotely controlling an electronic apparatus.
Figure 3:
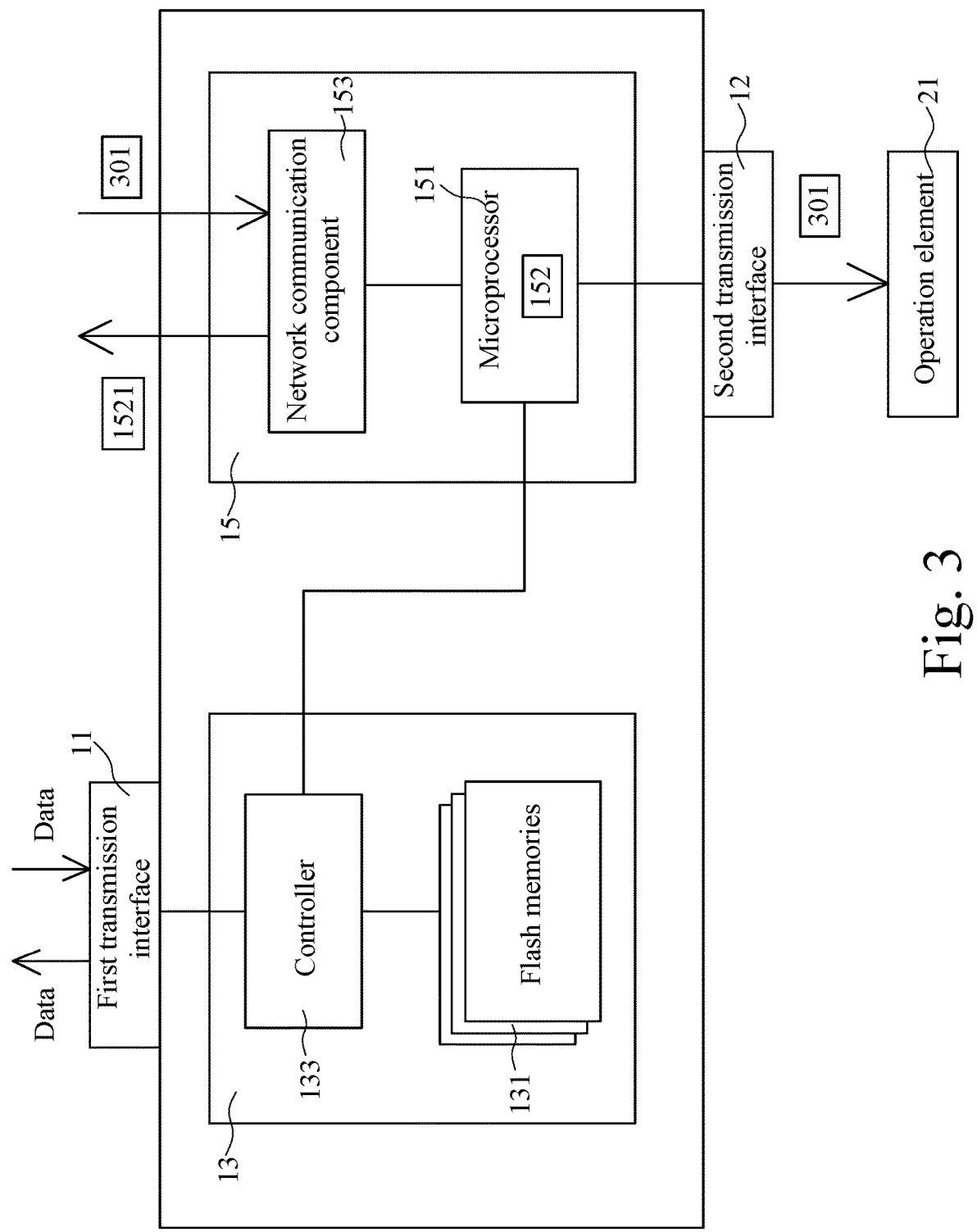
FIG. 3 is a circuit diagram of the data storage device according to one application embodiment of the present invention.

Referring to FIG. 2 and FIG. 3, there are shown an architecture diagram of a system according to one embodiment of the present invention, and a circuit diagram of the data storage device according to one application embodiment of the present invention, respectively. As shown in FIG. 2 and FIG. 3, the system 300 of the present invention includes at least one electronic apparatus 20 and a cloud management platform 30. The data storage device 10 may be disposed in the electronic apparatus 20.

The data storage device 10 includes the first transmission interface 11, the second transmission interface 12, a data storage unit 13, and an operation management unit 15. The data storage unit 13 includes a plurality of flash memories 131 and a controller 133 connected to the first transmission interface 11 and the flash memories 131. The electronic apparatus 20 reads data that is required for operation from the flash memories 131 of the data storage device 10 via the first transmission interface 11, or writes data generated during operation to the flash memories 131 of the data storage device 10 via the first transmission interface 11.

The operation management unit 15 includes a microprocessor 151. In one embodiment of the present invention, the microprocessor 151 is a chip with a network communication function, for example, a network communication component 153 being integrated in the microprocessor 151. In other embodiment of the present invention, the microprocessor 151 and the network communication component 153 are independent components, respectively, and the microprocessor151 is connected to the network communication component 153. The microprocessor 151 is configured with an embedded system 152 that is an architecture system of Linux or RTOS (such as TinyOS), and stored in non-volatile memories (NVMs). The manager of the cloud management platform 30 can monitor the operation of the electronic apparatus 20 via the embedded system 152 of the operation management unit 15. Besides, the operation management unit 15 communicates with the cloud management platform 30 via the network communication component 153. The network communication component 153 is a WiFi communication component, an Ethernet communication component, a 3G, 4G or 5G communication component, or other networkable communication component.

The electronic apparatus 20 includes at least one operation element 21. The microprocessor 151 of the operation management unit 15 is electrically connected to the operation element 21 via the second transmission interface 12, which is inserted into a connection port on a motherboard of the electronic apparatus 20. When the manager of the cloud management platform 30 wants the electronic apparatus 30 to execute a specific operation, he will send a specific operation instruction 301, 302, 303, or 304 to the electronic apparatus 20 by a management interface 31. The management interface 31 may be an application programming interface in WEB form (WEB App). After the operation management unit 15 of the data storage device 10 receives the specific operation instruction 301, 302, 303, or 304 sent from the cloud management platform 30 via the network communication component 153, the microprocessor 151 of the operation management unit 15 transmits the specific operation instruction 301, 302, 303, or 304 to the operation element 21, so as to command the operation element 21 to execute a corresponding operation according to the specific operation instruction 301, 302, 303, or 304.

Figure 4A:
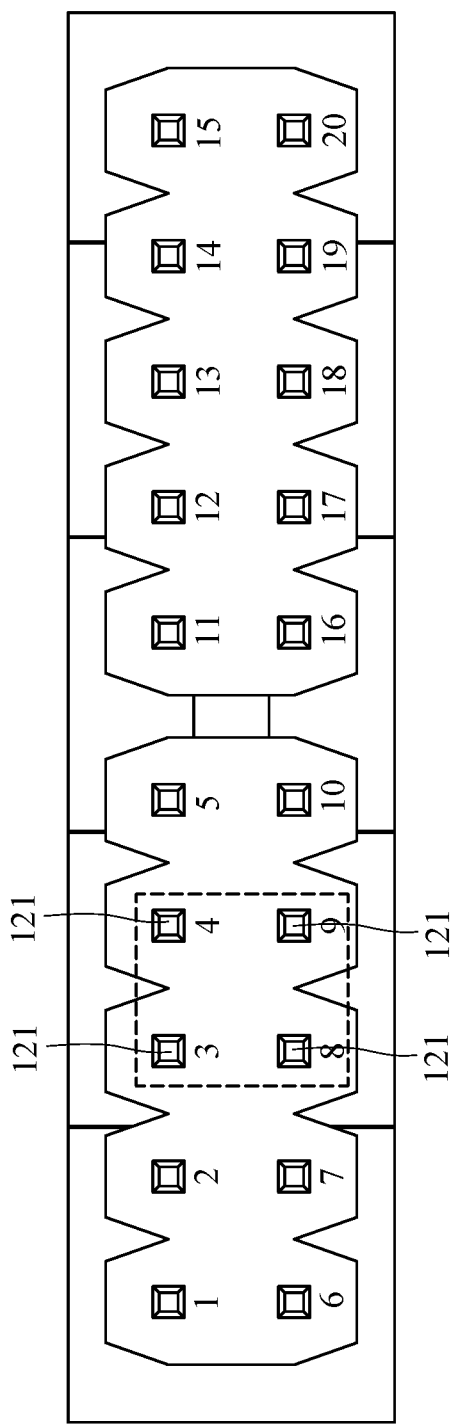
FIG. 4A is a structural view of pins of a second transmission interface of the data storage device according to one embodiment of the present invention.

As shown in FIG. 4A, further, the second transmission interface 12 of the data storage device 10 includes a plurality of pins, for example, twenty pins. In one embodiment of the present invention, the microprocessor 151 of the operation management unit 15 defines at least one control pin 121 from the pins of the second transmission interface 12, for example, the third pin (3), the fourth pin (4), the eighth pin (8), and the ninth pin (9) are defined as the control pins 121 by the microprocessor 151. Besides, the control pins 121 are defined by the microprocessor 151 of the operation management unit 15 as pins conforming to a single form of transmission specification, for example, the control pins 121 are defined as pins conforming to RS232 transmission specification. When the microprocessor 151 of the operation management unit 15 receives the specific operation instruction 301, 302, 303, or 304 sent from the cloud management platform 30, it will transmit the specific operation instruction 301, 302, 303, or 304 to the electronic apparatus 20 based on RS232 transmission specification via the control pins 121.

Figure 4B:
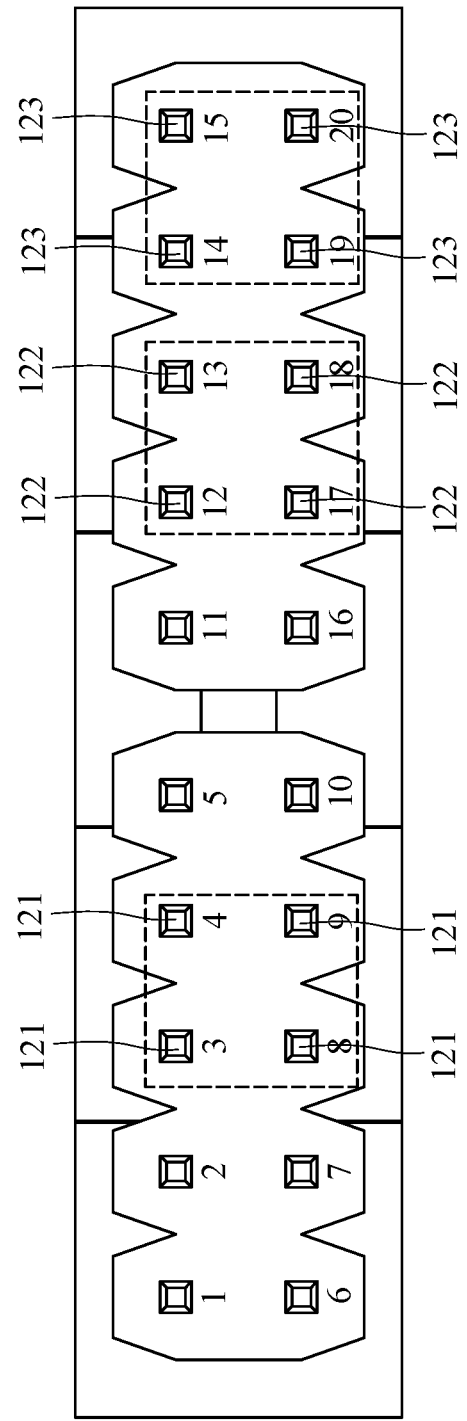
FIG. 4B is a structural view of pins of a second transmission interface of the data storage device according to another embodiment of the present invention.

In another embodiment of the present invention, as shown in FIG. 4B, the control pins 121, 122, and 123 of multiple forms of transmission specifications are defined from the pins of the second transmission interface 12 by the microprocessor 151 of the operation management unit 15. For example, the third pin (3), the fourth pin (4), the eighth pin (8), and the ninth pin (9) of the second transmission interface 12 are defined as the control pins 121 conforming to RS232 transmission specification, and used for transmitting the specific operation instruction 301, 302, 303, or 304 to the electronic apparatus 20 based on the RS232 transmission specification; the twelfth pin (12), the thirteenth pin (13), the seventeenth pin (17), and the eighteenth pin (18) of the second transmission interface 12 are defined as the control pins 122 conforming to CAN bus transmission specification, and used for transmitting the specific operation instruction 301, 302, 303, or 304 to the electronic apparatus 20 based on the CAN bus transmission specification; and the fourteenth pin (14), the fifteenth pin (15), the nineteenth pin (19), and the twentieth pin (20) of the second transmission interface 12 are defined as the control pins 123 conforming to Ethernet bus transmission specification, and used for transmitting the specific operation instruction 301, 302, 303, or 304 to the electronic apparatus 20 based on the Ethernet bus transmission specification. Accordingly, when the microprocessor 151 of the operation management unit 15 receives the specific operation instruction 301, 302, 303, or 304 sent from the cloud management platform 30, it will select the appropriate control pins 121, 122, or 123 to transmit the specific operation instruction 301, 302, 303, or 304 to the electronic apparatus 20 according to the specific transmission specification that may be recognized by the electronic apparatus 20.

In one application embodiment of the present invention, the electronic apparatus 20 is a computer apparatus, and the operation element 21 is a reset switch configured on a motherboard of the electronic apparatus 20. As shown in FIG. 3, when the embedded system 152 of the operation management unit 15 of the data storage device 10 monitors that the electronic apparatus 20 has crashed, it will actively report a crash message 1521 to the cloud management platform 30. After the manager of the cloud management platform 30 receives the crash message 1521, he will transmit an operation instruction 301 for resetting to the data storage device 10 of the electronic apparatus 20. The operation management unit 15 of the data storage device 10 transmits the operation instruction 301 to the operation element 21 of the electronic apparatus 20 via the second transmission interface 12 after receiving the operation instruction 301. The operation element (such as the reset switch) 21 executes a reboot operation for the electronic apparatus 20, such that the electronic apparatus 20 can resume normal operation.

Figure 5:
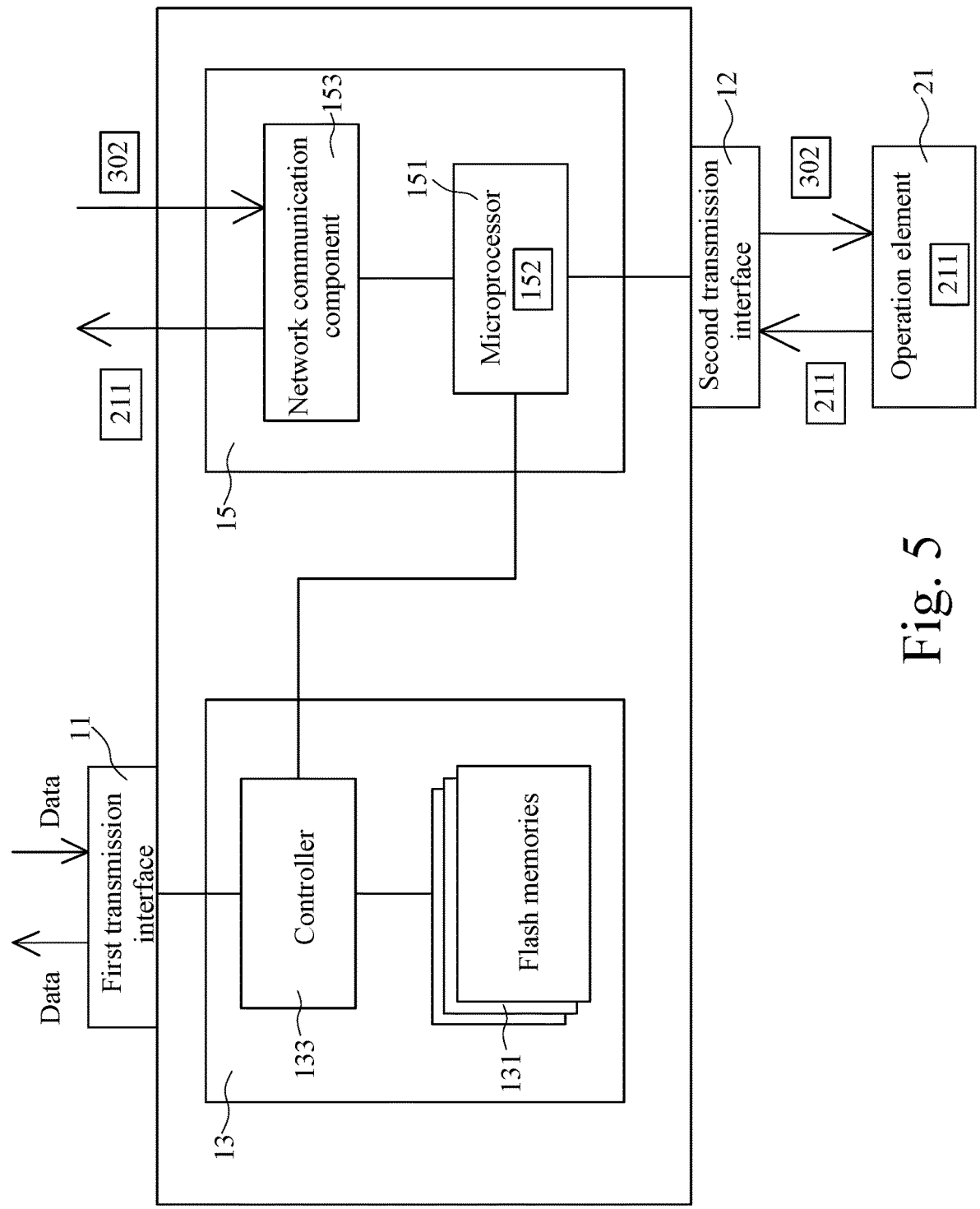
FIG. 5 is a circuit diagram of the data storage device according to another application embodiment of the present invention.

In another application embodiment of the present invention, the electronic apparatus 20 is a CNC (Computer Numerical Control) machine tool for producing products, and the operation element 21 is a flutter measuring device, for example, vibration sensor. As shown in FIG. 5, when the manager of the cloud management platform 30 wants to monitor the production process of the electronic apparatus 20, he will send an operation instruction 302 of monitoring a production status of the electronic apparatus 20 to the data storage device 10 of the electronic apparatus 20 via the management interface 31. The operation management unit 15 of the data storage device 10 transmits the operation instruction 302 to the operation element 21 after receiving the operation instruction 302 for monitoring the production status of the electronic apparatus 20. The operation element 21 executes a measuring operation for a flutter generated during the production process of the electronic apparatus 20 to generate a collected message 211 including data of flutter, and transmit the collected message 211 to the data storage device 10. The microprocessor 151 of the data storage device 10 transmits the collected message 211 received from the electronic apparatus 20 via the second transmission interface 12 to the cloud management platform 30. The cloud management platform 30 analyzes the data of flutter in the collected message 211 to determine whether the flutter generated during the production process of the electronic apparatus 20 is within a permissible vibration range. If the manager of the cloud management platform 30 acknowledges that the flutter generated during the production process of the electronic apparatus 20 has exceeded the permissible vibration range from the analysis of the data of flutter in the collected message 211, he will notify a worker of the electronic apparatus 20 to adjust at least one workpiece (such as cutter, main shaft, and bearing) of the electronic apparatus 20. Accordingly, the manager of the cloud management platform 30 can monitor the data of production status (such as the data of flutter) during the production process via the operation management unit 15 of the data storage device 10, and ask the worker to timely adjust the workpiece of the electronic apparatus 20 when the data of production status happens to variate greatly, so as to prevent the workpiece of the electronic apparatus 20 from being damaged during the production process, which further affects the accuracy of the produced products.

Figure 6:
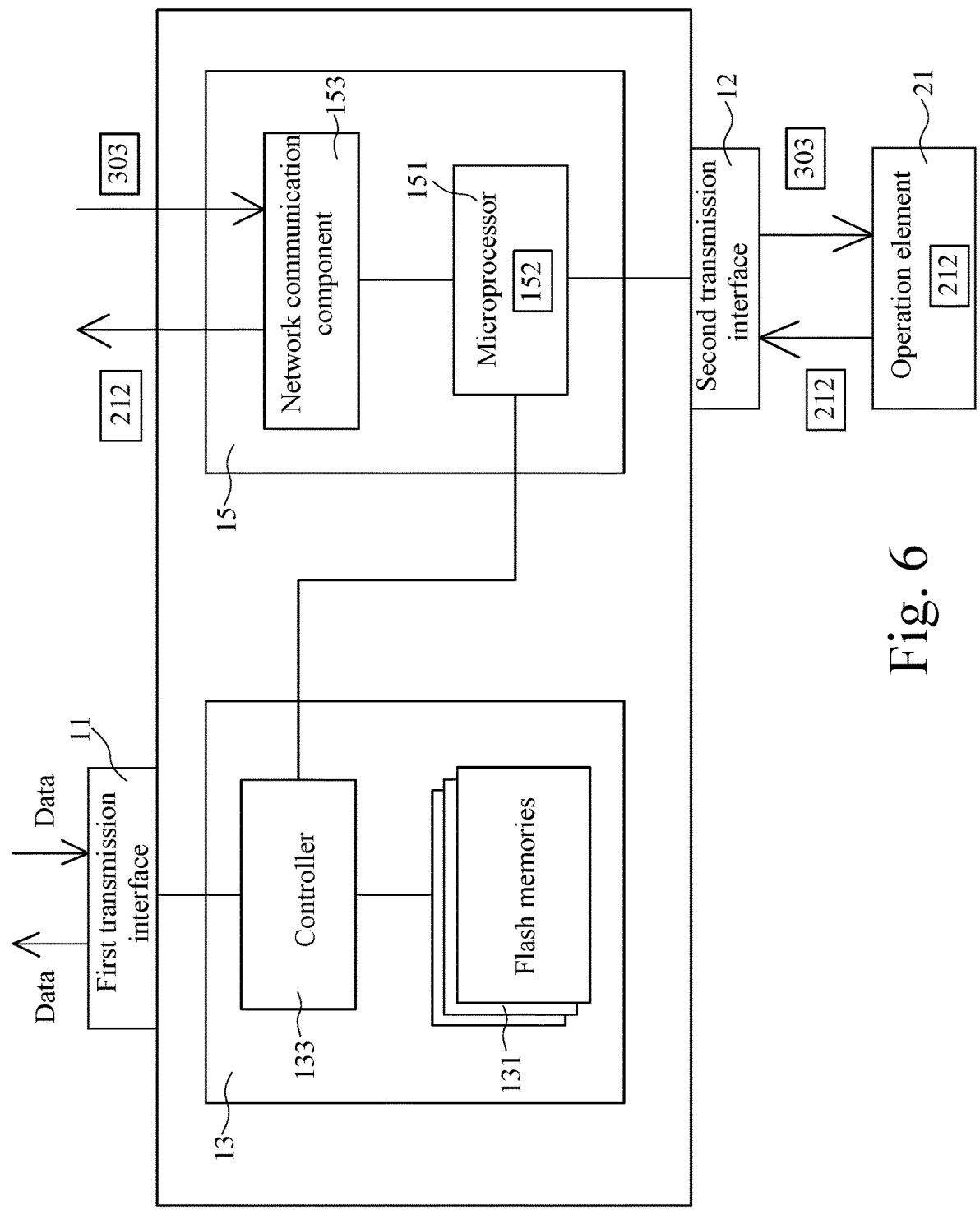
FIG. 6 is a circuit diagram of the data storage device according to another application embodiment of the present invention.

In another application embodiment of the present invention, the electronic apparatus 20 is a robotic arm for clipping objects, and the operation element 21 is a device for measuring an angle and a displacement. As shown in FIG. 6, when the manager of the cloud management platform 30 wants to monitor whether the electronic apparatus 20 is accurately rotated and displaced during the production process, he will send an operation instruction 303 for monitoring movements of the electronic apparatus 20 to the data storage device 10 of the electronic apparatus 20 via the management interface 31. The operation management unit 15 of the data storage device 10 further transmits the operation instruction 303 to the operation element 21 via the second transmission interface 12 after receiving the operation instruction 303. The operation element 21 measures a movement for the rotation angle and displacement of the electronic apparatus 20 during the production process according to the operation instruction 303, therefore generates a collection message 212 including a movement signal, and transmits the collection message 212 to the data storage device 10. The microprocessor 151 of the data storage device 10 receives the collection message 212 from the operation element 21 via the second transmission interface 12, and transmits the collection message 212 to the cloud management platform 30 via the network communication component 153. The manager of the cloud management platform 30 analyzes the movement signal in the collection message 212 to identify whether the rotation angle and displacement of the electronic apparatus 20 during the production process is consistent with a predetermined rotation angle and displacement. If the manager of the cloud management platform 30 identifies that a difference is existed between the rotation angle and displacement of the electronic apparatus 20 and the predetermined rotation angle and displacement, which might be due to a damage of a rotation mechanism (such as a rotation axis) of the electronic apparatus 20; then, the manager of the cloud management platform 30 will notify a worker of the electronic apparatus 20 to check and repair the rotation mechanism of the electronic apparatus 20. Thus, the cloud management platform 30 can remotely collect the movements and actions generated in the production process of the electronic apparatus 20 via the data storage device 10, in such a way that the remote manager can ask the worker to replace the rotation mechanism of the electronic apparatus 20 when the inaccurate movement of the electronic apparatus is discovered so that the electronic apparatus 20 can accurately clip the object and deliver the object to the correct position.

Figure 7:
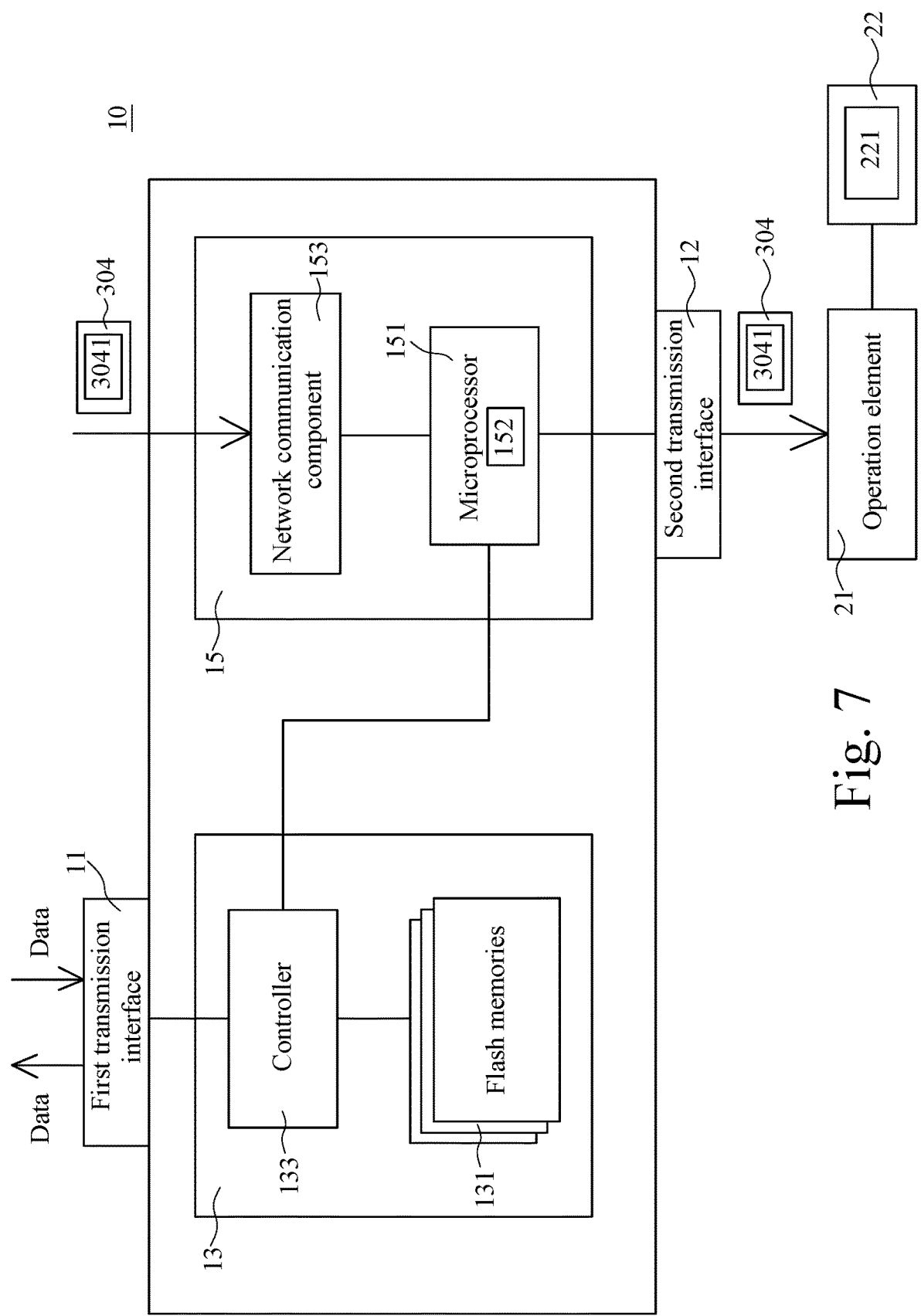
FIG. 7 is a circuit diagram of the data storage device according to another application embodiment of the present invention.

In another application embodiment of the present invention, as shown in FIG. 7, the electronic apparatus 20 is a food production device, the operation elements 21 is a microcomputer control system for producing food and its production elements, and the electronic apparatus 20 further includes a NVM (Non-Volatile Memory) 22 for recording a food production program file 221. When the manager of the cloud management platform 30 wants to update a food production program of the electronic apparatus 20, he will send an operation instruction 304 of update program to the data storage device 10 of the electronic apparatus 20 via the management interface 31. The operation instruction 304 includes a program updating file 3041. The operation management unit 15 of the data storage device 10 transmits the operation instruction 304 to the operation elements 21 after receiving the operation instruction 304. The operation elements 21 updates the food production program file 221 in NVM 22 by the program updating file 3041 of the operation instruction 304. Afterwards, the operation elements 21 can execute the production of food according to the updated food production program file 221. So, the cloud management platform 30 can remotely update the food production program of the electronic apparatus 20 via the data storage device 10, and thereby the convenience in the updating of the food production program can be increased.

Summing the above, via the configuration of the two transmission interfaces, the data storage device 10 can be used not only to access a general data, but also used by the remote manager to control the operation of the electronic apparatus 20. Besides, the four embodiments in the above described are only some implementations of the present invention. In actual application, the cloud management platform 30 sends a variety of different types of operation instructions to the data storage device 10 of the electronic apparatus 20 according to the model and type of the electronic apparatus 20, or according to the requested monitoring of the production status, the operation status, or the operation environment of the electronic apparatus 20, such that the electronic apparatus 20 can execute the corresponding operation according to the request and command of the operation instruction.

Figure 8:
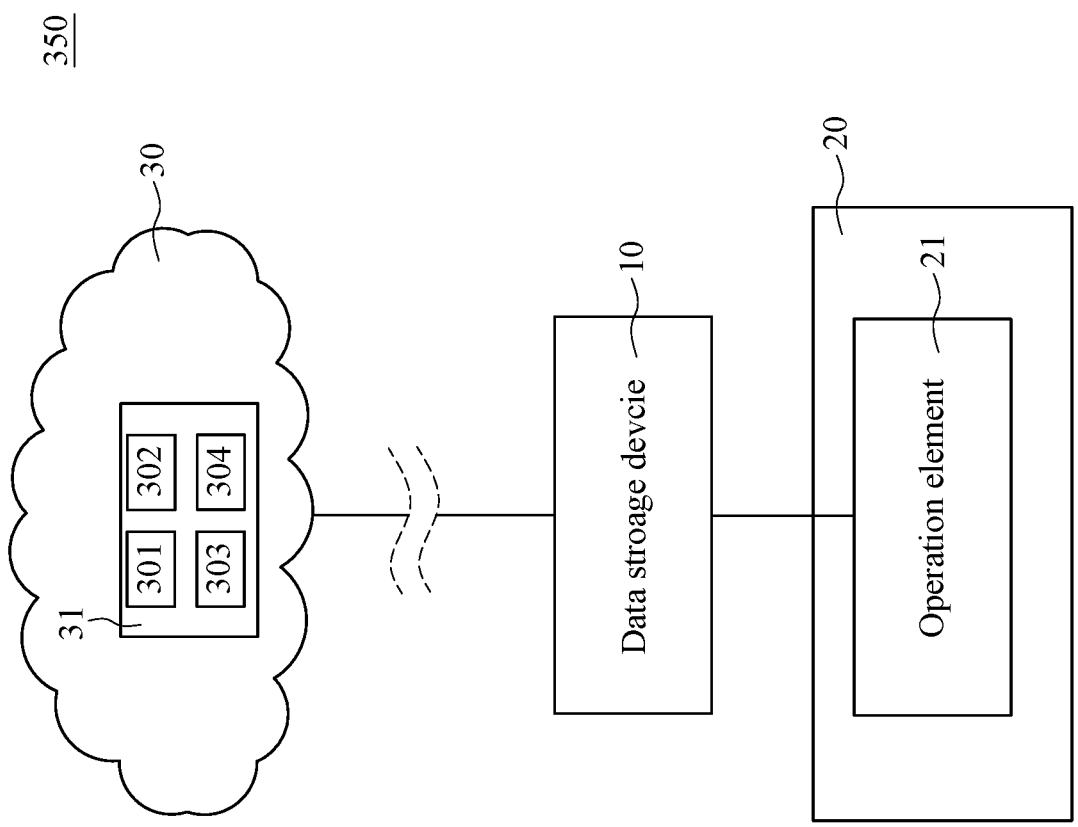
FIG. 8 is an architecture diagram of a system according to another embodiment of the present invention, wherein the system is capable of remotely controlling an electronic apparatus.

Referring to FIG. 8, there is shown an architecture diagram of a system capable of remotely controlling an operation of the electronic apparatus according to another embodiment of the present invention. In the system 300 of the above described embodiment, the data storage device 10 is a device provided within the electronic apparatus 20; comparatively, in the system 350 of the present invention, the data storage device 10 is a device independent of the electronic apparatus 20, and electrically connected to the operation element 21 of the electronic apparatus 20 via the second transmission interface 12 that is inserted into a connection port protruded from a case of the electronic apparatus 20. Accordingly, the operation element 21 of the electronic apparatus 20 receives the operation instruction 301, 302, 303, or 304 sent from the cloud management platform 30 via the external data storage device 10, and executes the corresponding operation according to the operation instruction 301, 302, 303, or 304.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A data storage device, comprising:
    a first transmission interface;
    a second transmission interface;
    a data storage unit comprising a plurality of flash memories and a controller connected to the flash memories and the first transmission interface, wherein data stored in the flash memories can be read or data can be written to the flash memories via the first transmission interface; and
    an operation management unit comprising a network communication component and a microprocessor connected to the second transmission interface and the network communication component, wherein the microprocessor is connected to at least one operation element of an electronic apparatus via the second transmission interface, wherein the data storage device is a device configured in the electronic apparatus or a device independent of the electronic apparatus;
    wherein, when the operation management unit receives a specific operation instruction, the microprocessor of the operation management unit transmits the specific operation instruction to the electronic apparatus via the second transmission interface, and the electronic apparatus executes a corresponding operation according to the specific operation instruction;
    wherein the microprocessor is configured with an embedded system that is able to monitor an operation of the at least one operation element of the electronic apparatus.

2. The data storage device according to claim 1, wherein the first transmission interface is a transmission interface conforming to a SATA transmission specification, a PCIe transmission specification, or a M.2 transmission specification.

3. The data storage device according to claim 1, wherein the second transmission interface is a transmission interface conforming to an industrial communication transmission specification, an Ethernet communication specification, or an input and output transmission specification.

4. The data storage device according to claim 3, wherein the second transmission interface is a transmission interface of serial bus, CAN bus, Ethernet, SPI, PoE, or GPIO.

5. The data storage device according to claim 1, wherein the second transmission interface comprises a plurality of pins, the microprocessor of the operation management unit defines at least one control pin from the plurality of pins of the second transmission interface, the at least one control pin is a pin conforming to a specific type of transmission specification, and the microprocessor of the operation management unit transmits the specific operation instruction to the electronic apparatus based on the specific type of transmission specification via the at least one control pin.

6. The data storage device according to claim 1, wherein the network communication component is a WiFi communication component, an Ethernet communication component, or a 3G, 4G or 5G communication component.

7. An electronic apparatus, comprising:
    at least one operation element; and
    a data storage device comprising:
        a first transmission interface;
        a second transmission interface;
        a data storage unit comprising a plurality of flash memories and a controller connected to the flash memories and the first transmission interface, wherein the electronic apparatus reads data stored in the flash memories or writes data to the flash memories via the first transmission interface; and
        an operation management unit comprising a network communication component and a microprocessor connected to the second transmission interface and the network communication component, wherein the data storage device is connected to the at least one operation element via the second transmission interface;
    wherein when the operation management unit receives a specific operation instruction, the microprocessor of the operation management unit transmits the specific operation instruction to the electronic apparatus via the second transmission interface, and the electronic apparatus executes a corresponding operation according to the specific operation instruction;
    wherein the microprocessor is configured with an embedded system that is able to monitor an operation of the at least one operation element of the electronic apparatus.

8. The electronic apparatus according to claim 7, wherein the first transmission interface is a transmission interface conforming to a SATA transmission specification, a PCIe transmission specification, or a M.2 transmission specification.

9. The electronic apparatus according to claim 7, wherein the second transmission interface is a transmission interface conforming to an industrial communication transmission specification, an Ethernet communication specification, or an input and output transmission specification.

10. The electronic apparatus according to claim 9, wherein the second transmission interface is a transmission interface of serial bus, CAN bus, Ethernet, SPI, PoE, or GPIO.

11. The electronic apparatus according to claim 7, wherein the second transmission interface comprises a plurality of pins, the microprocessor of the operation management unit defines at least one control pin from the plurality of pins of the second transmission interface, the at least one control pin is a pin conforming to a specific type of transmission specification, and the microprocessor of the operation management unit transmits the specific operation instruction to the electronic apparatus based on the specific type of transmission specification via the at least one control pin.

12. The electronic apparatus according to claim 7, wherein the network communication component is a WiFi communication component, an Ethernet communication component, or a 3G, 4G or 5G communication component.

13. A system capable of remotely controlling electronic apparatus, comprising:
a cloud management platform comprising a management interface; and
an electronic apparatus, comprising:
at least one operation element; and
a data storage device, comprising:
a first transmission interface;
a second transmission interface;
a data storage unit comprising a plurality of flash memories and a controller connected to the flash memories and the first transmission interface, wherein the electronic apparatus reads data stored in the flash memories or writes data to the flash memories via the first transmission interface; and
an operation management unit comprising a network communication component and a microprocessor connected to the network communication component and the second transmission interface, wherein the data storage device is connected to the at least one operation element via the second transmission interface;
wherein the cloud management platform sends a specific operation instruction to the data storage device of the electronic apparatus by the management interface, and the operation management unit of the data storage device receives the specific operation instruction via the network communication component and transmits the specific operation instruction to the at least one operation element such that the at least one operation element executes a corresponding operation according to the specific operation instruction;
wherein the microprocessor is configured with an embedded system that is able to monitor an operation of the at least one operation element of the electronic apparatus.

14. The system according to claim 13, wherein the specific operation instruction sent from the cloud management platform is an operation instruction for resetting, the operation element is a reset switch, and the operation management unit of the data storage device transmits the operation instruction for resetting to the operation element via the second transmission interface after receiving the operation instruction for resetting, such that the operation element executes a reboot operation for the electronic apparatus.

15. The system according to claim 13, wherein the first transmission interface is a transmission interface conforming to a SATA transmission specification, a PCIe transmission specification, or a M.2 transmission specification.

16. The system according to claim 13, wherein the second transmission interface is a transmission interface conforming to an industrial communication transmission specification, an Ethernet communication specification, or an input and output transmission specification.

17. The system according to claim 16, wherein the second transmission interface is a transmission interface of serial bus, CAN bus, Ethernet, SPI, PoE, or GPIO.

18. The system according to claim 13, wherein the second transmission interface comprises a plurality of pins, the microprocessor of the operation management unit defines at least one control pin from the plurality of pins of the second transmission interface, the at least one control pin is a pin conforming to a specific type of transmission specification, and the microprocessor of the operation management unit transmits the specific operation instruction to the electronic apparatus based on the specific type of transmission specification via the at least one control pin.

* * * * *